US008960940B2

(12) United States Patent
Hellkamp

(10) Patent No.: US 8,960,940 B2
(45) Date of Patent: Feb. 24, 2015

(54) LEVEL LIGHT

(76) Inventor: Martin Edward Hellkamp, Roanoke, VA (US)

(*) Notice: Subject to any disclaimer, the term of this patent is extended or adjusted under 35 U.S.C. 154(b) by 0 days.

(21) Appl. No.: 13/537,002

(22) Filed: Jun. 28, 2012

(65) Prior Publication Data

US 2013/0249435 A1 Sep. 26, 2013

Related U.S. Application Data

(60) Provisional application No. 61/502,827, filed on Jun. 29, 2011.

(51) Int. Cl.
*F21V 21/30* (2006.01)
*F21L 4/04* (2006.01)
*H05B 37/02* (2006.01)
*B62J 1/00* (2006.01)
*F21V 23/04* (2006.01)
*F21V 33/00* (2006.01)
*F21V 21/08* (2006.01)
*F21V 21/092* (2006.01)
*F21V 21/096* (2006.01)
*F21V 21/14* (2006.01)
*F21Y 101/02* (2006.01)

(52) U.S. Cl.
CPC . *F21L 4/04* (2013.01); *F21V 21/30* (2013.01); *H05B 37/02* (2013.01); *B62J 1/00* (2013.01); *F21V 23/0492* (2013.01); *F21V 33/00* (2013.01); *F21V 21/0832* (2013.01); *F21V 21/092* (2013.01); *F21V 21/096* (2013.01); *F21V 21/145* (2013.01); *F21Y 2101/02* (2013.01)
USPC ........... 362/106; 362/156; 362/102; 362/190; 362/464; 315/297

(58) Field of Classification Search
USPC .............. 362/102, 106, 156, 190, 249.1, 464; 315/297
See application file for complete search history.

(56) References Cited

U.S. PATENT DOCUMENTS

| | | | |
|---|---|---|---|
| 2004/0015103 A1* | 1/2004 | Aminian et al. | 600/595 |
| 2008/0130272 A1* | 6/2008 | Waters | 362/106 |
| 2010/0125172 A1* | 5/2010 | Jayaraj | 600/249 |
| 2010/0309651 A1* | 12/2010 | Uzar | 362/106 |
| 2013/0014790 A1* | 1/2013 | Van Gerpen | 135/66 |
| 2013/0329439 A1* | 12/2013 | Hellkamp | 362/464 |

* cited by examiner

*Primary Examiner* — Vibol Tan
(74) *Attorney, Agent, or Firm* — Pike IP Law, PLLC; Bernard G Pike

(57) ABSTRACT

A lighting apparatus having a light source and a leveling mechanism capable of maintaining the light source in a desired orientation is described. The lighting apparatus may have a pivot mechanism about which the light source is capable of rotating such that the lighting apparatus maintains the desired orientation. In specific embodiments, the lighting apparatus comprises a directional light source, a pivot mechanism, a connector capable of connecting the pivot to another object, and a mechanism that allows the light source to rotate about the pivot to maintain a desired orientation. The lighting apparatus may be connected to an object, such as a piece of wheeled luggage, such that when the luggage is tilted the light source maintains an desired orientation such as a horizontal orientation.

25 Claims, 9 Drawing Sheets

LEVEL LIGHT

RELATED APPLICATIONS

This application claims priority under 35 U.S.C. 119 to U.S. Provisional Patent Application Ser. No. 61/502,827 filed on Jun. 29, 2011, which is hereby incorporated by reference in its entirety.

TECHNICAL FIELD

Lighting apparatuses are used to illuminate areas. In specific embodiments, the lighting apparatus comprises at least one light source, a pivot, a connector capable of connecting the pivot to another object, and a leveling mechanism that allows the light source to rotate about the pivot to maintain a desired orientation. In further embodiments, the lighting apparatus may comprise a housing with at least one transparent portion, wherein the light source is rotatably connected within the housing. In still further embodiments, the lighting apparatus comprises a plurality of light sources, processing unit, and an orientation sensing device such as a gyroscope, wherein processing unit provides power to at least a portion of the light sources based upon the position of the orientation sensing device.

BACKGROUND

Many types of lighting devices exist for illuminating objects while working with the hands, reading, walking, hiking or jogging. The most common example is the hand held flashlight; which is a self-contained lighting device powered by a portable power source, (i.e. battery, batteries, or photovoltaic cell, for example), connected to a light source such as, for example, at least one bulb or light emitting diode ("LED"). These devices typically comprise a hand operated switch to turn electrically connect the power source to the light source. These portable lighting devices ("flashlights") are manufactured in many sizes, shapes and configurations for specific applications, including, but not limited to, lights mounted to flexible arms for reading, lights mounted to head bands for running and working in a hands free method; and the most common are the portable hand held models.

People understand the convenience of hands free operation of portable lighting devices and thus various methods of mounting these devices to objects have been developed to assist in hands free use. When bike riding, jogging, traveling or walking, it is generally desirable to be able to see the pathway in which you are traveling. Even though there may have some ambient light (street lights, parking lot lights, full moons, etc.), many people, for safety and peace of mind, may prefer to use additional lighting so they are both more visible to others and they have enhanced visibility ahead of themselves. There are at least two problems presented in carrying additional lighting, the problem of appropriate light source being available and the problem of an appropriate light source being convenient. When walking to or from parking lots, taxi stands or traveling (by air, train, bus, car, etc.) having a "flashlight" when you need one may be inconvenient; and in the event that you do have one available, it is not generally easy to walk with objects such as luggage, pull carts, strollers, wheel barrows, or ride on a bicycle or a tricycle while focusing a light in the direction of travel, this problem is especially amplified when you are faced with the problem of using both hands to pull a wheeled luggage, find your keys and/or manipulate your keys, open doors, or carrying two pieces of luggage, a purse, shopping bags, a briefcase, or another object and a wheeled luggage. In this modern day of hand held communication devices, it is not uncommon to observe people pulling their wheeled luggage with one hand while talking on the cell phone with the other. This makes carrying a conventional flashlight impractical.

There exists a need for a lighting apparatus that may be used conveniently while using your hands for a different activity such as pulling wheeled luggage. There further exists a need for a hands free lighting source that maintains the proper orientation without further manipulation by the user.

SUMMARY

Embodiments of the invention are directed to a lighting apparatuses. An embodiment of a lighting apparatus may comprise a first light source, a pivot rotatably connected to the light source; and a leveling mechanism. In other embodiments, the pivot may be fixedly attached to the light source and the pivot is rotatably connected to another object such as a housing. The leveling mechanism may be capable of urging the light source to rotate about the pivot to maintain a desired orientation as the housing or other object connected to the light source is rotated or tilted. In another embodiment, the lighting apparatus may comprise a plurality of light sources that are controlled by a processing unit. The processing unit may be connected to an orientation sensor to power at least a portion of the light sources. The processing unit may comprise a computer chip with an electronic gyro. The electronic gyro may sense a change in orientation of the lighting apparatus and activate a different set of light sources to maintain the light in a desired direction such as, for example, horizontal.

In some embodiments, the lighting apparatus may comprise multiple light sources such as a first light source and a second light source. In other embodiments, the lighting source may comprise a plurality of light sources, such as two or more sets of light sources. Each set of light sources may comprise any number of light sources, from 2 to 10 individual light sources in each set, for example. Each light source or set of light sources may comprise its own power circuit including power source, wiring, controller, and switches or may share any or all of these components.

The lighting apparatus may comprise a liquid leveling mechanism or a mechanical leveling mechanism capable of urging the light source to a desired orientation; or may comprise an orientation sensing device and a processor. The processor may be connected to circuits for illuminating a particular portion of the light sources or sets of light sources in response to the orientation of the lighting apparatus. The processor may further activate a servo motor that adjusts the location of the light source based upon the orientation of the lighting apparatus. For example, a gyroscope may sense that the lighting apparatus has tilted and rotate the light source in an opposite direction for substantially the same distance so that the light is shining in substantially the same direction. In embodiments of the lighting apparatus comprising a plurality of light sources or sets of light sources, the processing unit may deactivate light source or set of light sources and activate a different light source or set of light sources based upon a change in orientation of the lighting apparatus when compared to the horizontal. The processing unit may be programmable to allow the modification of the direction of light based upon the orientation of the lighting apparatus. For example, the processor may be programmed to maintain lighting in a forward horizontal direction or in a forward horizontal direction and a rearward horizontal direction or in a forward horizontal direction, in a rearward horizontal direction and in a forward downward direction, such as a 45° downward direction versus the horizontal.

In further examples, a light source may be rotatably connected by a pivot within a sealed cylindrical housing and is capable of rotating about the pivot within the sealed cylindrical body. The sealed cylindrical body may comprise a liquid that stays in a bottom portion of the sealed cylindrical body as the sealed cylindrical body is rotated. The sealed cylindrical body may comprise a liquid that maintains a horizontal surface. For example, the housing may be about half filled with the liquid or less than half filled with the liquid, for example. The pivot may be connected substantially to the center of the sealed cylindrical housing.

In further embodiments, the lighting apparatus may comprise a connector capable of attaching the lighting apparatus to an object. The connector may be rotatably connected to the light source at a pivot. The light source is capable of rotating about the pivot.

Other aspects and features of embodiments of the level lights comprising at least light source and a leveling mechanism will become apparent to those of ordinary skill in the art, upon reviewing the following description of specific, exemplary embodiments of the present invention in concert with the figures. While features may be discussed relative to certain embodiments and figures, all embodiments can include one or more of the features discussed herein. While one or more particular embodiments may be discussed herein as having certain advantageous features, each of such features may also be integrated into various other of the embodiments of the invention (except to the extent that such integration is incompatible with other features thereof) discussed herein. In similar fashion, while exemplary embodiments may be discussed below as system or method embodiments it is to be understood that such exemplary embodiments can be implemented in various systems and methods.

BRIEF DESCRIPTION OF THE DRAWINGS

FIG. 9 depicts the housing after rotation of the housing from its original position in FIG. 8 illustrating that the water level remains horizontal after rotation of the housing about axis in the direction of the arrows;

FIG. 12A depicts an embodiment of the lighting apparatus attached to a stroller, FIG. 12B depicts an embodiment of the lighting apparatus attached to wheeled luggage, and FIG. 12C depicts an embodiment of the lighting apparatus attached to a bicycle helmet;

DESCRIPTION OF EMBODIMENTS

Figure 1:
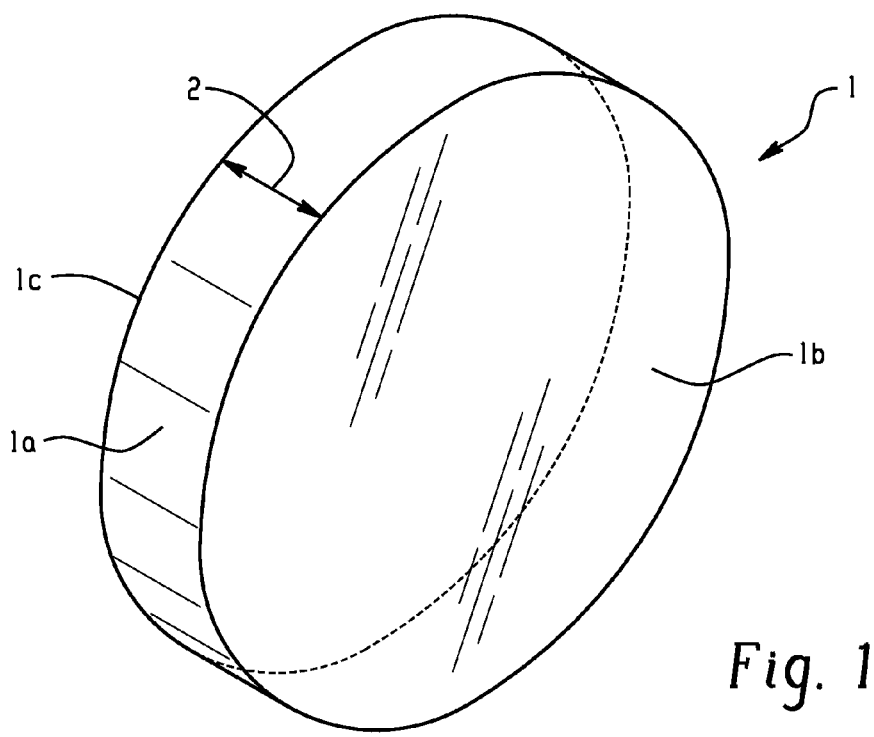
FIG. 1 depicts an embodiment of a housing for an embodiment of the level light.

Embodiments of the lighting apparatus provide a hands free operation and simple solution to mount a directional beam lighting source such as, but not limited to, a "flashlight" to luggage. A conventional flashlight may be mounted to the side of a piece of luggage with tape or a strip of Velcro attached to the flashlight and then simply pulled it off and stored in the luggage when not in use. This solution of a luggage mounted flashlight is simple and yet effective hands free method to light the path in front of you while you walk carrying or pulling luggage. However, this method of lighting is flawed. As a user walks with a piece of luggage that has a flashlight or other directional light source fixedly attached to their luggage, the angle in which the light shines changes when the angle of the object you are carrying or pulling changes. Specifically, the relative angle between the luggage and the flashlight is fixed and does not change as the luggage is tilted for rolling on its wheels. For instance, when you first pull out the handle on a wheeled piece of luggage, the luggage is typically in an upright vertical position. If a flashlight was attached to shine horizontally with the luggage in the upright vertical position, the light would, when turned on, be directed to shine horizontally. However, once the handle is extended and the luggage is tilted so that the wheels in the front or bottom of the luggage support the weight of the luggage, the light would be directed toward the ground necessitating readjustment of the directional light source for rolling and sitting. While the ability to travel and utilize the design of wheeled luggage is enhanced, if a lighting device is attached to the side of the luggage, the light shines in a non-horizontal angle or direction when the luggage is tilted for pulling. In fact, if mounted parallel to the ground (the typical direction that an individual would want a light to shine while walking), as soon as a person would start walking, the light would now shine at an angle off horizontal equal to the angle of the object it was mounted has changed. For instance if the luggage was tilted forward, the light would now shine at an angle less than ideal to illuminate a directional path in front of the user. Because luggage comes in a variety of sizes, height, handle lengths, and shapes; the angle that a particular people will tilt a particular piece of luggage is different based upon, among other things, their height, arm length and comfort; this is further complicated by the type and slope of terrain, finding a fixed angle for mounting a flashlight on a piece of luggage that would work in all cases is difficult, if not impossible. Even then, the flashlight would be directed in an upward angle when the luggage is returned to the un-tilted, upright position or being carried by the handle.

Embodiments of the lighting apparatus provide a solution to the problem of the keeping the light of a flashlight shining horizontally (or other desired angle) when an object in which that lighting apparatus is attached to, such as a piece of luggage, is tilted. Embodiments of the lighting apparatus comprise a connector for attaching a light to an object so that a desired direction such as, but not limited to, horizontal, of the directional light beam is maintained no matter how the angle of the object is changed relative to the horizontal, the leveling mechanism adjusts the angle of the directed beam of light. This is accomplished by incorporating a pivoting mechanism and/or a leveling mechanism into the lighting apparatus.

One embodiment of the lighting apparatus comprises a mechanism that allows the light source to rotate about the pivot to maintain a desired orientation. The mechanism may be operated by gravity, for example. The light may be, for example, rotatably mounted through a pivot point so that the light rests in or above a liquid. The light may be close enough to the level of the liquid or "floating" on the surface of the liquid in a sealed housing such that when the water surface rotates relative to the light source, the light source would pivot in the same direction as the leveling liquid thereby remaining horizontal. Similar to tilting a glass that is half full of water, the water level will always remain in a horizontal position. If a light was "floating" and pivotally mounted right above the water line, the light would maintain the same horizontal position when the glass was tilted because the surface of the water remains horizontal. And if the light was turned on, whenever the tilt of the glass changed, a directional light source would continue to shine horizontally.

In certain embodiments, the lighting apparatus comprises a sealed housing, a light source rotatably mounted on a pivot within the housing, a liquid within the housing wherein the flashlight is capable of pivoting on or above the liquid substance, wherein an angle of the housing and the surface of the liquid would remain horizontal and the beam of light shining from the pivoting barrel remains at a substantially constant angle relative to the horizontal. The sealed housing may comprise a cap comprising a threaded connection and an o-ring or other sealing means. At least on cap may be removed to allow the battery to be changed, for example. The flashlight may be a barrel flashlight, for example. If the lighting apparatus is attached to the side of a piece of wheeled luggage, for example, as the luggage is tilted, the directional light source will remain substantially horizontal. Hence a "level light" is obtained.

In other embodiments, the lighting apparatus may comprise a mechanical leveling mechanism to replace the liquid leveling mechanism. The mechanical leveling mechanism may rely on the force of gravity to allow the flashlight to pivot to point in the desired direction, such as but not limited to, the horizontal direction. For example, the flashlight may comprise at least one counterweight that urges the flashlight to point in the desired direction, such as but not limited to, the horizontal direction.

Further embodiments of the lighting apparatus may comprise a second light source. The second light may be directed in the same or different direction than the first light source. In addition to having the added advantage of a substantially consistent horizontal beam of light attached to an object; embodiments of the lighting apparatus may comprise a rearward directed light. The lighting apparatus may comprise a forward directed light and a rearward directed light, for example. The lights may be of the same or different color. The forward directed light may be a white light and the rearward directed light may be a red or amber light, for example. Such color combinations are used to conventionally to indicate the direction a person or object having the light is facing or traveling. Other light color combinations could also be used. By adding a red light emitting diode ("LED") to the opposite end of a barrel light that produces the forward shining white light, the device now illuminates a consistently horizontal red light that may be seen from the behind the user. This design feature allows the user to be more easily seen from behind by others such as drivers in automobiles, other walkers, bikers, or runners etc; providing a built in safety feature similar to the running lights of a car.

Using embodiments of the lighting apparatus, someone walking on the street or walking from an airport to their car can attach a consistently horizontal light source to the side of their luggage and not only see what is front of them but will also be seen by others from behind. A person walking from the grocery store to their car at night can attach the level lights to the side of the grocery cart and more readily see and be seen by others. A runner running at night can now have a level light attached to their hat, sweat band or hip and have a constant horizontal beam in front of them and a red amber indicator light that can be seen from behind. Additionally, a boater trying to dock in moving water could have a steady light source shinning on a fixed object like a dock even though the waves are moving the boat up and down. Either of the light sources may be a blinking light source or comprise a switch that converts a constant beam to a blinking or flashing beam of light.

One embodiment of the lighting apparatus, shown in FIGS. 1 to 4 comprises a round cylindrical enclosure 1, the "housing". The housing 1 is not flat as can be seen by in the figures. In this embodiment, the housing comprised a cylindrical side wall 1*a* and may further comprise two circular caps 1*b* and 1*c* on each end of the cylindrical side wall. The caps may be connected to the cylindrical side wall by any means including, but not limited to, friction fit, snap fit, molded together or adhesives, for example. Each cap may be connected to cylindrical side wall by different means, for example, one cap may be molded with the cylindrical side wall and one cap may be held by a snap fit such that a protrusion is received in a recess in the cylindrical side wall, for example. As such, the cylindrical side wall 1*a* and the two circular cps 1*b* and 1*c* form a cavity. The end caps may further comprise a pivot or pivot member. The pivot member may define an aperture such as a circular aperture or a protrusion such as a cylindrical protrusion. In such embodiments, the lighting apparatus is rotatably connected to the circular caps by the pivot member.

Figure 2:
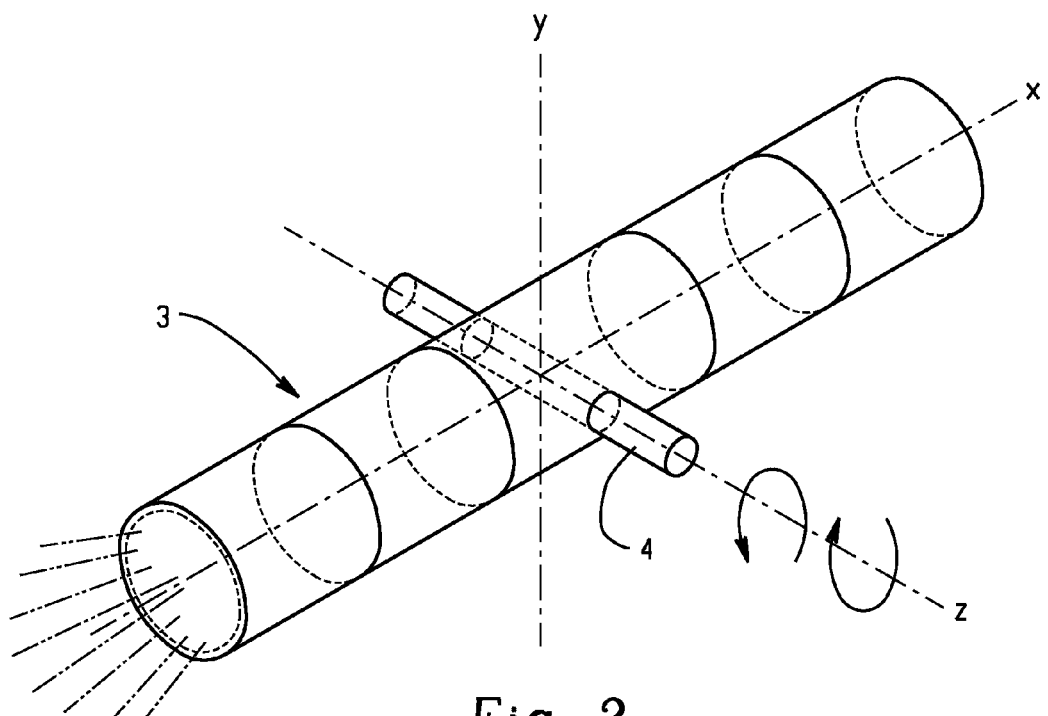
FIG. 2 depicts an embodiment of a light source and a pivot for including in the housing.
Figure 3:
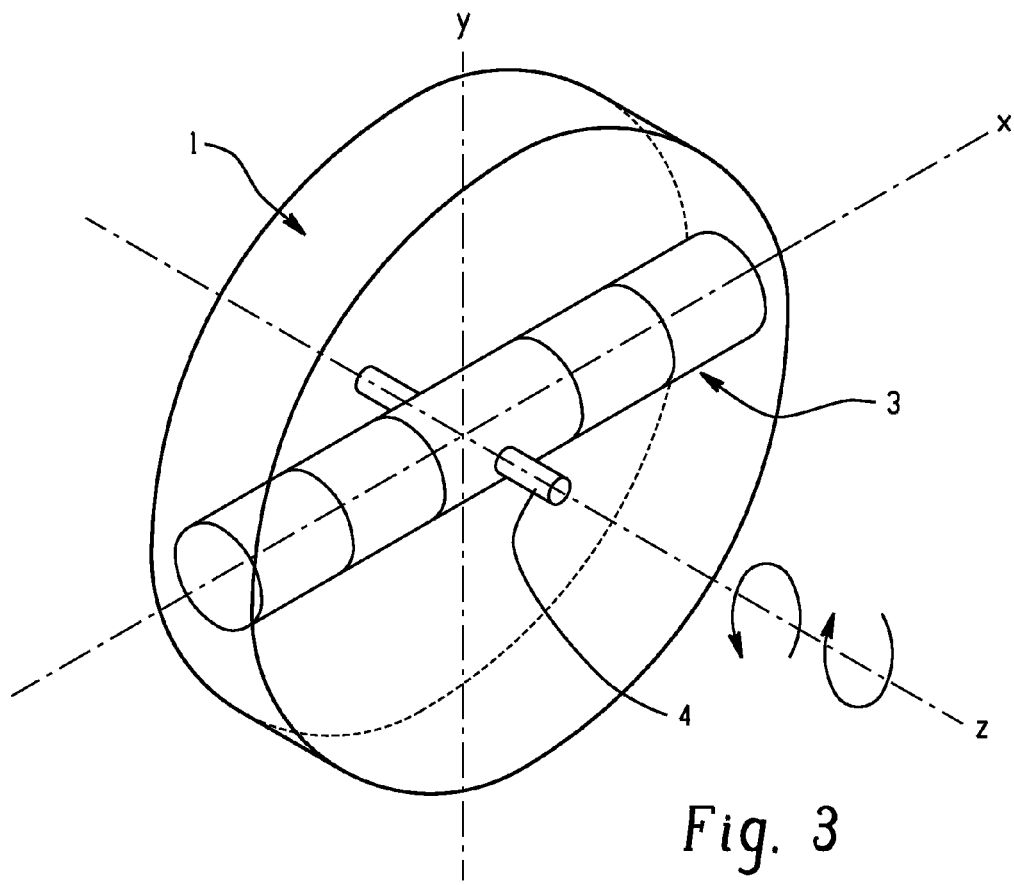
FIG. 3 depicts a perspective view of an embodiment of a lighting apparatus comprising a light source and a pivot rotatably connected to a housing, the lighting apparatus may further comprise a mechanism that allows the light source to rotate about the pivot to maintain a desired orientation.
Figure 4:
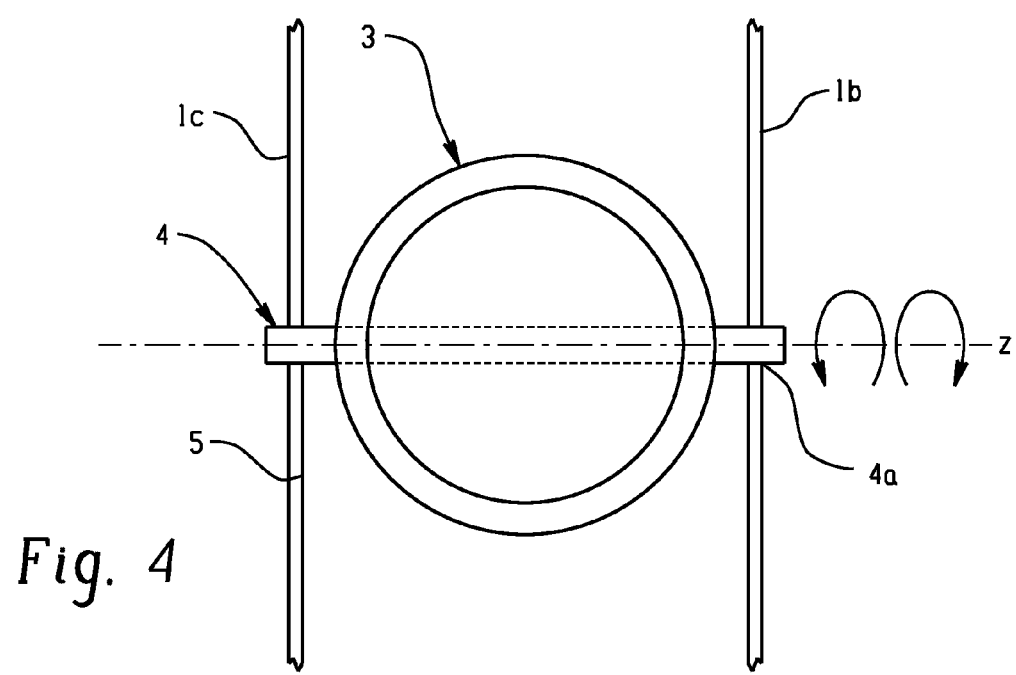
FIG. 4 depicts a cross-sectional view of the embodiment of the lighting apparatus shown in FIG. 3.

The inside width 2 (thickness) of the housing 1 between the two end caps may be any width that is capable of enclosing the desired light source, such as a directional light source, without restricting rotational movement of the light source. The embodiments of the housing shown in FIG. 1, the inside width is sufficient accommodate an enclosed barrel light 3 as shown in FIG. 2. As such, the inside width 2 of the housing 1 is greater than the outside diameter of the barrel light 3. Thus, the barrel light 3 when mounted inside the housing 1 may rotate or pivot. Other types and shapes of lights are also capable being mounted within housing 1 and pivoting about a pivot, pivot point or pivot element ("pivot member") may also be used in the invention. The barrel light 3 comprises a pivot member 4. The pivot member 4 may be through a center of the side of the barrel light along the "z" axis so that it can rotate either clockwise and counter clockwise around the pivot member 4 in the plane formed by x and y axes. The pivot member may also be located at other portions of the light device such as, but not limited to, a top portion of the light device or on an extension from the light source housing. The pivot member allows the lighting device to rotate or pivot so the lighting device remains in the desired orientation as an object that the lighting device is attached to is moved or tilted. In the embodiment shown in FIG. 3, the barrel light 3 may be rotatably mounted inside the housing 1. The housing 1 may comprise at least one recess capable of receiving the pivot member 4 of the barrel light 3 to provide the rotatable connection and the pivoting mechanism. In the embodiment shown in FIG. 3, the pivot member 4 is a cylindrical protrusion that may be received in a recess 4a defined by the end caps 1a and 1b of the housing. Additional embodiments of the lighting apparatus may incorporate this design or may comprise a housing comprising the cylindrical protrusion and a lighting device comprising at least one the recess capable of receiving the member. For example, the pivot member may comprise a pin, axle, recess, bearings, or other rotating connection and may be integral to another component such as the housing or the lighting device or may be a separate component or components.

As such, the barrel light 3 may be rotatably attached to the sides of the housing 1 by the pivot member 4. In the embodiment shown in FIG. 4, the pivot member 3 comprises a pin integral to and extending through the barrel light 3. As stated above, in other embodiments, the pin or axle may be formed integral to the barrel light 3. The circular caps 1a and 1b on the sides 5 of the housing 1 may be a transparent or opaque material such as, but not limited to, glass, plastic or metal, while the peripheral surface 6 (width) of cylindrical side wall 1a of the housing 1 comprises a transparent or semitransparent material such as, but not limited to, glass or plastic that allows light shine through. The peripheral surface 6 may be a lens of the lighting apparatus 1 and may comprise colored lens. In this embodiment, two light sources shine from the ends of the barrel light 1 that is mounted inside the housing 1; a red LED light illuminates to the rear and a white LED illuminates forward. The housing 1 may be round and comprise a transparent lens around the entire perimeter surface 6, see FIG. 6. The housing may also be of different shapes such as square, rectangular, oval, spherical or other shape, for example. The housing may also comprise light sources such as an array of LEDs that are mounted to a cylindrical housing, the light sources may extend around an entire peripheral surface of the cylindrical housing or over at least one portion of the peripheral surface of the cylindrical housing.

In further embodiments, the lighting apparatus or the housing may comprise a connector or connecting element that may be used to attach the lighting apparatus to another object. For example, one side 5 of housing 1 may be attached by a hook and loop connector such as Velcro™ to mount the lighting apparatus to a fixed object. The hook and loop connectors may be attached to the housing by an adhesive and the other side of the hook and loop connector may be attached to the object by adhesive, for example. Embodiments of the lighting apparatus may comprise other connectors or connecting elements such as, but not limited to at least one of a hook and loop connector, adhesives, double sided tape, a bracket for a square tube, a bracket for a round tube, a U-type bracket, a lab frame type connector with a thumb screw, a screw, a bolt, a bracket, a magnet, a suction cup, other connector or combination of connectors.

In some embodiments, the relatively small, portable and compact design can be mounted on any surface that the connector is able to be attached to, either permanently or temporarily. Because the light is self-leveling, the lighting apparatus may be connected to any bicycle, tricycle, wheelchair or luggage handle frame, regardless of the frame design and angle of the frame member and provide the desired orientation of the light.

Embodiments of the lighting apparatus comprise a leveling mechanism that allows the light source to rotate about the pivot to maintain a desired orientation relative to horizontal. The desired orientation may be horizontal for forward illumination or angled downward to illuminate the ground in front of the user, for example. The leveling mechanism may comprise a housing, such as housing 1, comprising a liquid or a counter weight connected to the light source (See FIGS. 13 and 14, for example), electronic computer chip with a programmable processor and orientation sensor used to switch on LEDs, or other leveling mechanism.

For example, a leveling mechanism comprising a counter weight may be incorporated into a lighting apparatus with or without a housing. In such embodiments without a housing, the lighting apparatus may comprise a pivot mechanism, wherein the pivot mechanism may comprise a connector or connecting element capable of being attached to an object. In some embodiments, the light source may be used as a counterweight suspended from the pivot rotatable connected within the housing.

Figure 7:
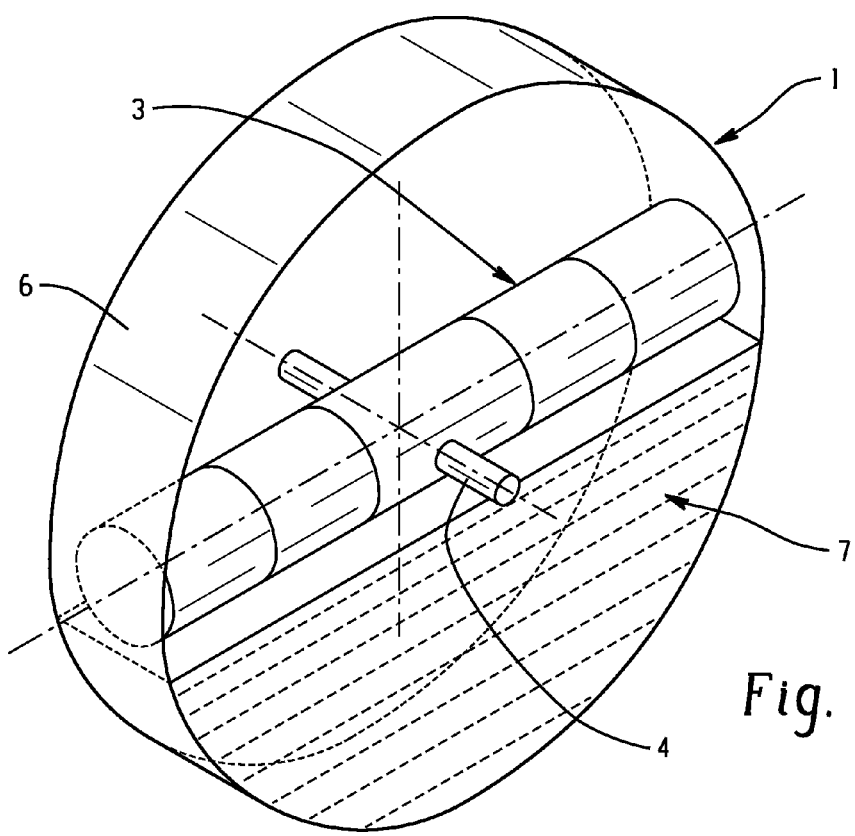
FIG. 7 depicts a perspective view of an embodiment of a lighting apparatus comprising a light source, a pivot and a housing comprising a liquid that allows the light source to rotate about the pivot to maintain a desired orientation, wherein the light source is rotatably connected within the housing.
Figure 8:
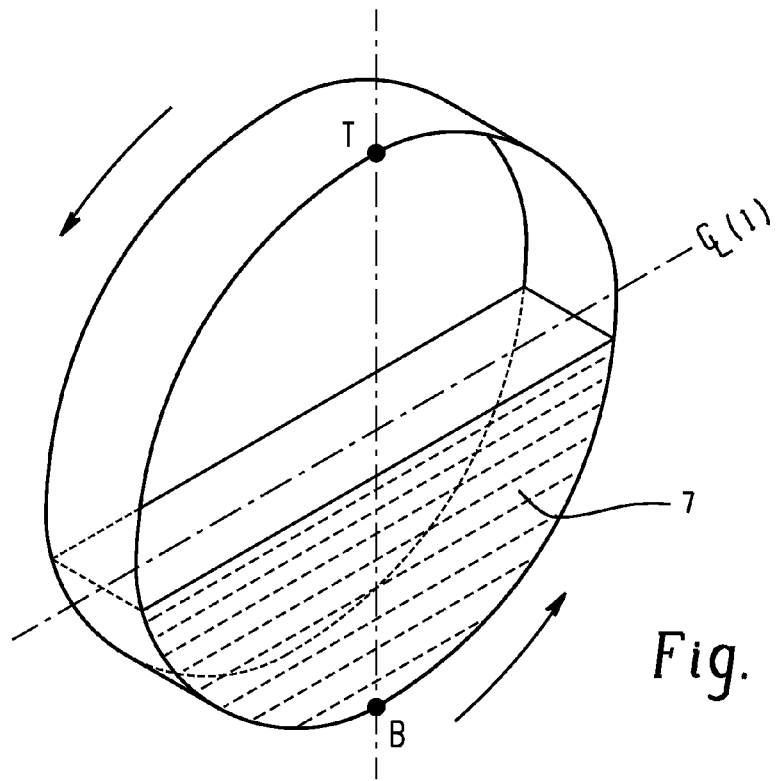
FIGS. 8 and 9 depict the rotation of an embodiment of the housing of lighting apparatus comprising a liquid leveling mechanism.
Figure 9:
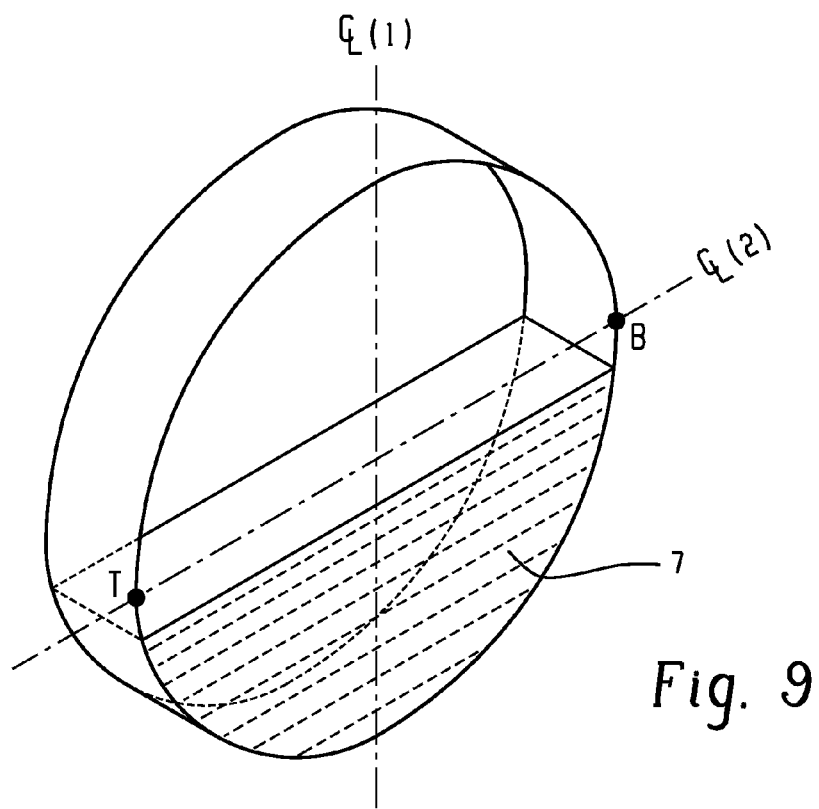
Figure 10:
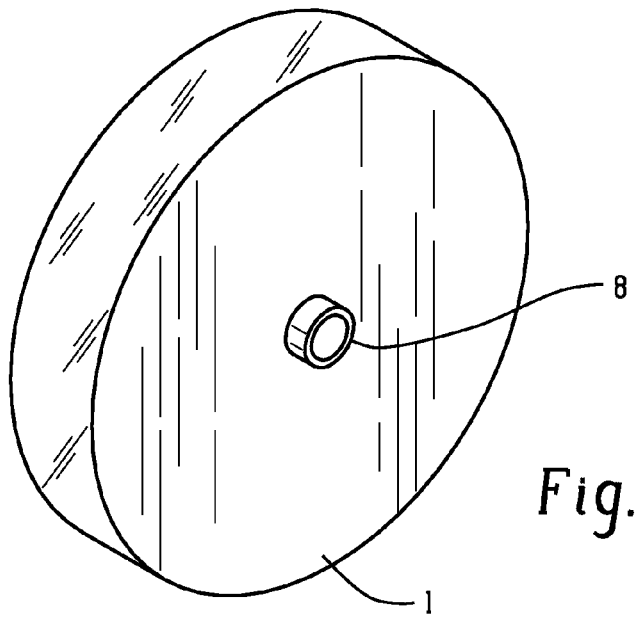
FIG. 10 depicts an embodiment of a lighting apparatus with an on/off switch located at the center point of a circular end cap.

In the embodiments of the lighting apparatus of FIGS. 7 to 11 and 13 to 14, the lighting apparatus comprises a leveling mechanism in the bottom of the housing. In the embodiments shown in FIGS. 7 to 9, the leveling mechanism may comprise a sealed housing partially filled with a liquid 7, for example, in some embodiments the level of the liquid 7 in the housing may be at or slightly below the axis of rotation of the pivot of the barrel light. The liquid may be water, an aqueous solution, a hydrocarbon liquid such as a, but not limited to, a light weight oil. FIG. 8 shows the housing 1 with the top and bottom marked with "T" and "B" respectively. In this embodiment, the level of the liquid within the housing 1 is just below the horizontal center line ₵ (1). For example, when the housing 1 is rotated counter clockwise 90 degrees to the new position as shown in FIG. 9, "T" and "B" are now in their new position wherein ₵ (1) is in a vertical position. The level of the liquid 7 within the housing is now just below the new horizontal center line ₵ (2) and the light source rotates with the surface of the liquid 7 and remains horizontal. Because the surface of the liquid 7 always remains in a horizontal position, the pivotal barrel light 3 mounted inside the housing through a center pivotal axis will also remains in a level horizontal position. The surface of the liquid 7 controls the angle of the barrel light 3 and will remain substantially horizontal when the housing 1 attached to an object is tilted. In such embodiments, the components of the light source or the barrel light may be constructed with a buoyant material or be filled and sealed with a gas such as air. In such embodiments, the light source or barrel light will float on the liquid to stay horizontal on the top surface of the liquid. A switch that turns the light on and off may be incorporated into the center axis of rotation of the pivotal barrel.

Figure 5:
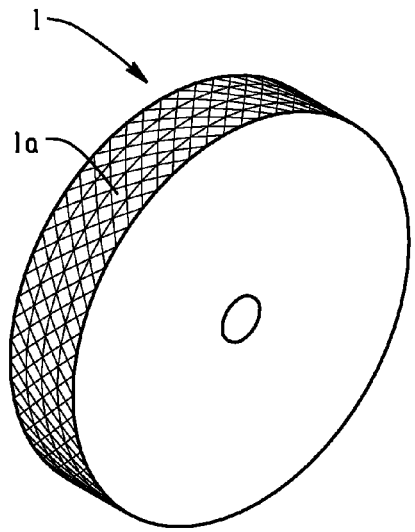
FIG. 5 depicts an embodiment of a housing for a lighting apparatus wherein the side walls are opaque and the circumferential portion is transparent and comprises facets for focusing or diffusing the light emitted from the light source.

The embodiment of the housing 1 comprising a cylindrical side wall 1a. The cylindrical side wall 1a of the embodiment shown in FIG. 5 comprises a multiple facets that may either focus or diffuse the light emitted from the lighting device within the housing.

Figure 6:
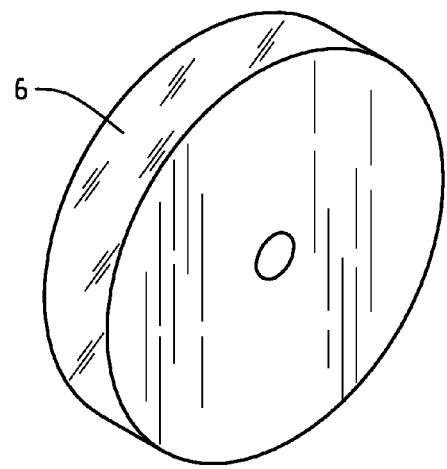
FIG. 6 depicts another embodiment of a housing for a lighting apparatus wherein the side wall is transparent around its entire surface, wherein the housing comprises a cylindrical side wall and two circular end caps.

Further embodiments of the lighting apparatus comprise a 360 degree lens, for example as shown in FIG. 6, and directional light source capable of rotating. A directional light source as used herein comprise a light source, a power source and a reflector to focus or concentrate the light emitted from the light source, such as a parabolic reflector. The 360 degree lens may be a peripheral surface of the cylindrical housing. In some embodiments, the light source may comprise two directional light sources.

Another aspect of the invention comprises a pivotal barrel light, as the directional light source, rotatably mounted in the center of the cylindrical housing. The cylindrical housing may comprise a liquid, for example as shown in FIG. 7, or other leveling mechanism that keeps the pivotal barrel light horizontal to the ground or in another desired direction by pivoting along with the leveling mechanism (i.e. a liquid, a ball bearing, hanging weights, counter weight, for example.). In an embodiment of the lighting apparatus comprising a liquid leveling mechanism, the housing 1 may be sealed to retain the liquid 7 within the housing. More generally, embodiments of the invention may comprise a cylindrical housing that contains a light and leveling mechanism capable of maintaining the light shining in a desired orientation, for example, a horizontal orientation.

The light source may be any conventional light source such as, but not limited to, a light bulb, a light emitting diode, an organic light emitting diode, or a fluorescent light, for example. In some embodiments, the lighting apparatus comprises two light sources such as, but not limited to, a white LED that shines forward from one end of a barrel shaped light while a red illuminating light shines from the other end of the barrel.

In still further embodiments, the lighting apparatus may comprise a mechanical leveling mechanism. As used herein, a mechanical leveling mechanism in a leveling mechanism that does not comprise a liquid. Embodiments of a lighting apparatus comprising a mechanical leveling mechanism are shown in FIG. 11, FIG. 13, FIG. 14, and FIG. 15A through FIG. 15D. A mechanical leveling mechanism may be used in conjunction with a housing or may be used without a housing by being attached directly to an object.

Figure 11:
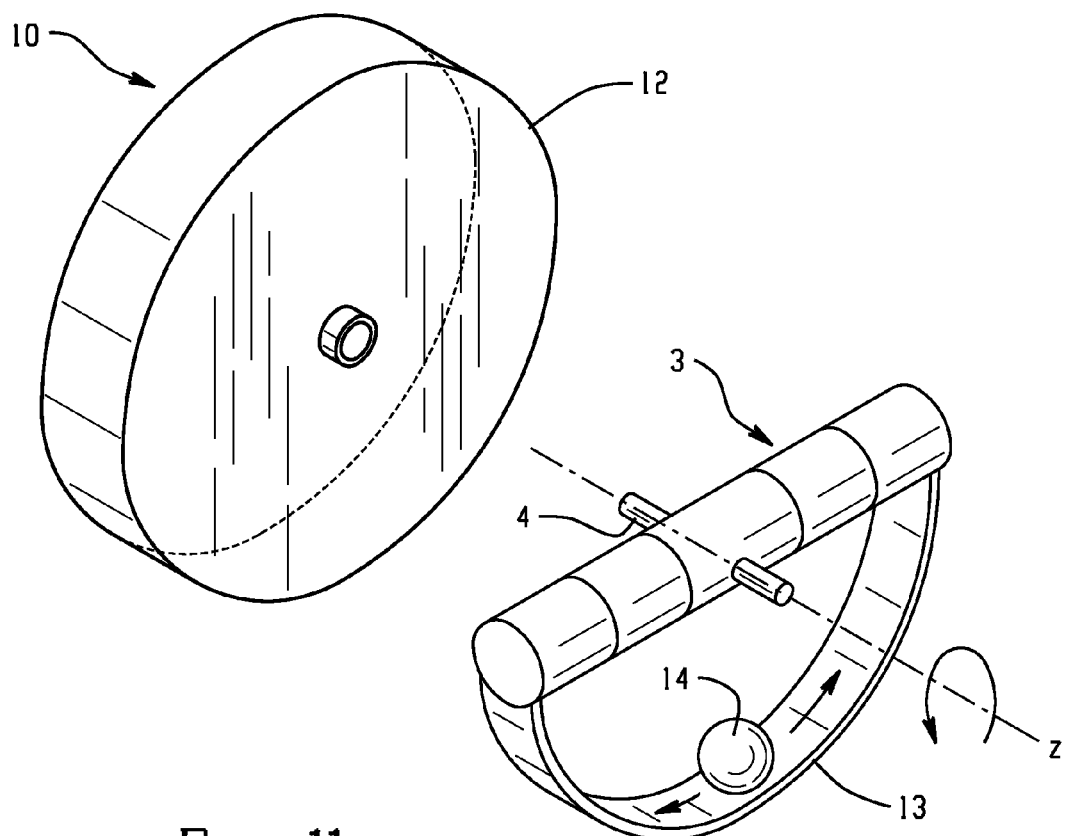
FIG. 11 depicts an embodiment of a lighting apparatus comprising a mechanical mechanism that allows the light source to rotate about the pivot to maintain a desired orientation.
Figure 13:
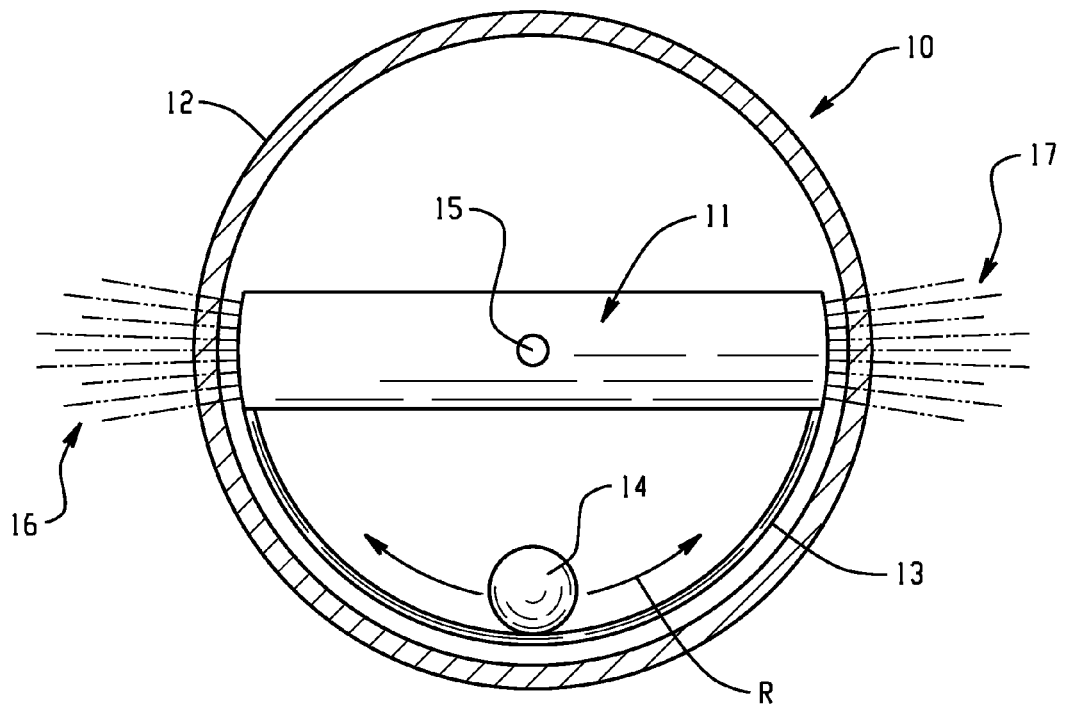
FIG. 13 depicts a further embodiment of a lighting apparatus comprising a mechanical mechanism that allows the light source to rotate about the pivot to maintain a desired orientation.

One embodiment of the lighting apparatus is shown in FIG. 11 and the cutaway drawing shown in FIG. 13. depict an embodiment of a lighting apparatus 10 comprising a barrel light 11 and a mechanical leveling mechanism. In this embodiment, the mechanical leveling mechanism comprises a half cylindrically shaped "rocker" 13. The rocker 13 acts as a counter weight that is capable of urging the light source to rotate about the pivot to maintain a desired orientation. The rocker 13 may be of sufficient weight to rotate about the pivot 2 the light source as the object is rotated or tilted. In further embodiments, mechanical leveling mechanism comprises an optional ball 14 and the rocker 13 retained and rotatably connected within a housing. The rocker 13 and housing 1 provide a pathway for a ball 14 to travel back and forth when the object and the lighting apparatus 10 are tilted. Because the ball 14 will always seek the lowest point in the rocker 13 due to gravity, no matter what angle the outside housing 12 is tilted, the ball 14 will roll to the lowest point and thus the barrel light 11 will return to a substantially horizontal position as the housing 12 rotates about the pivot 15. This embodiment of the lighting apparatus comprises a lighting device rotatably connected inside of the cylindrical housing 11 at pivot 15. The ball 14 may be placed inside of the rocker 13 assembly prior to closing the housing 1. As can be seen in FIG. 13, a 360 degree peripheral lens 12 of the housing 1 allows white light 16 to shine through the front of the lighting apparatus and amber light 17 to shine from the other end of the light device 11. This half cylindrical "rocker" body is sized so that it can also rotate within the enclosure, preferably, but not necessarily, without touching the sides of the housing.

Figures 12A, 12B:
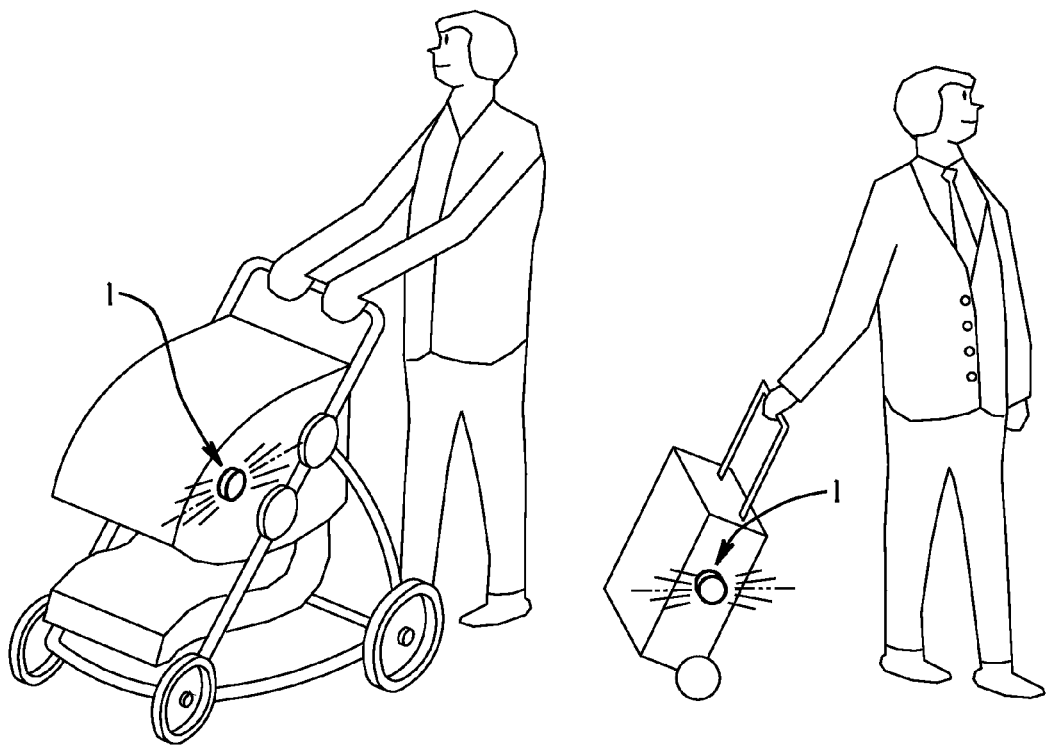
FIG. 12A, FIG. 12B and FIG. 12C depict embodiments of the lighting apparatus attached to various objects.
Figure 12C:
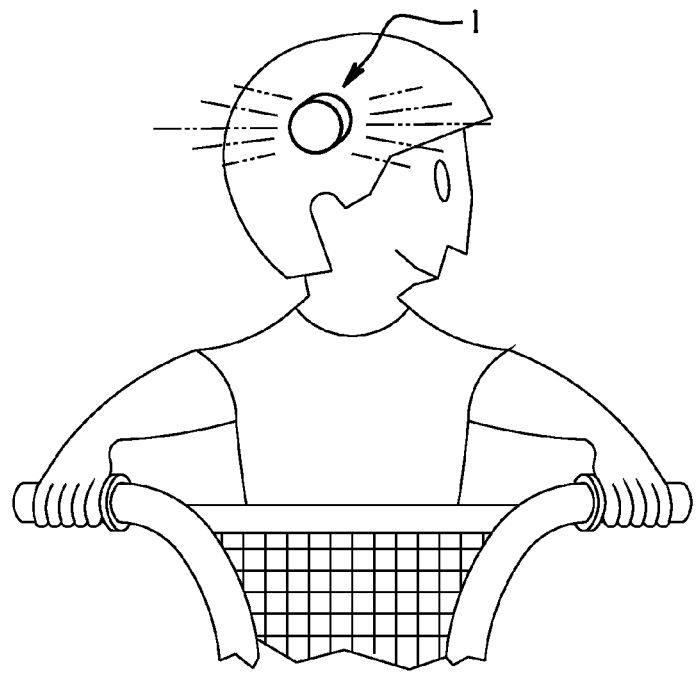
Figure 14:
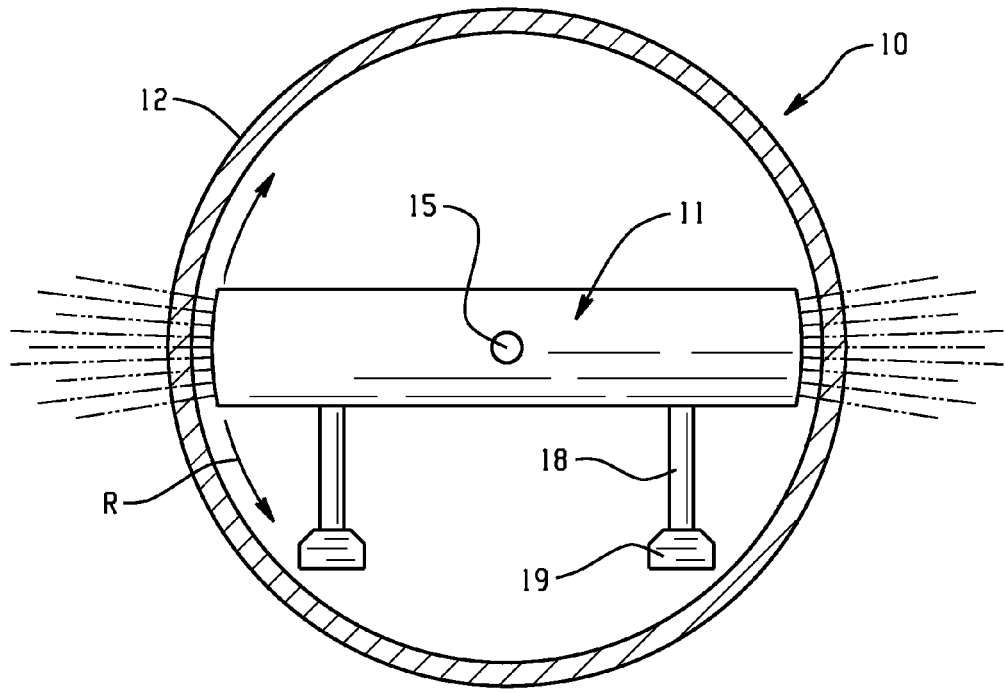
FIG. 14 depicts a still further embodiment of a lighting apparatus comprising a mechanical mechanism that allows the light source to rotate about the pivot to maintain a desired orientation with use of two spaced apart weights.

FIGS. 12A through 12C depict embodiments of the lighting apparatus attached to various objects, such as on a stroller (FIG. 12A), on wheeled luggage (FIG. 12B), or on a bicycle helmet (FIG. 12C). The lighting apparatus may also have novelty applications such as used at the wheels of a child's push toy, ride on toy or battery powered vehicle including a remote controlled vehicle Another embodiment of a lighting apparatus comprising a mechanical leveling mechanism is shown in FIG. 14. This embodiment of the lighting apparatus 1 comprises at least one counter weight 19 attached to the bottom of the lighting device 11. Such embodiments may comprise at least one counter weight attached directly to the lighting device 11 or attached by an intermediate extension member 18. The intermediate extension member 18 connected to the counter weights 19 may be rigid or flexible. Another variation of the embodiment would be to hang multiple small weights from both end portions of the lighting device within the housing as shown in FIG. 14. For an embodiment of the lighting apparatus comprising one counter weight, the counter weight of the intermediate extension connector may be connected to a central portion of the lighting device or below the center of gravity or pivot point 15 of the lighting device 11 (not shown). The counter weight(s) 19 will maintain the lighting device in a desired orientation such as a horizontal orientation. The lighting device may rotate about the pivot 15.

Figures 15A, 15B:
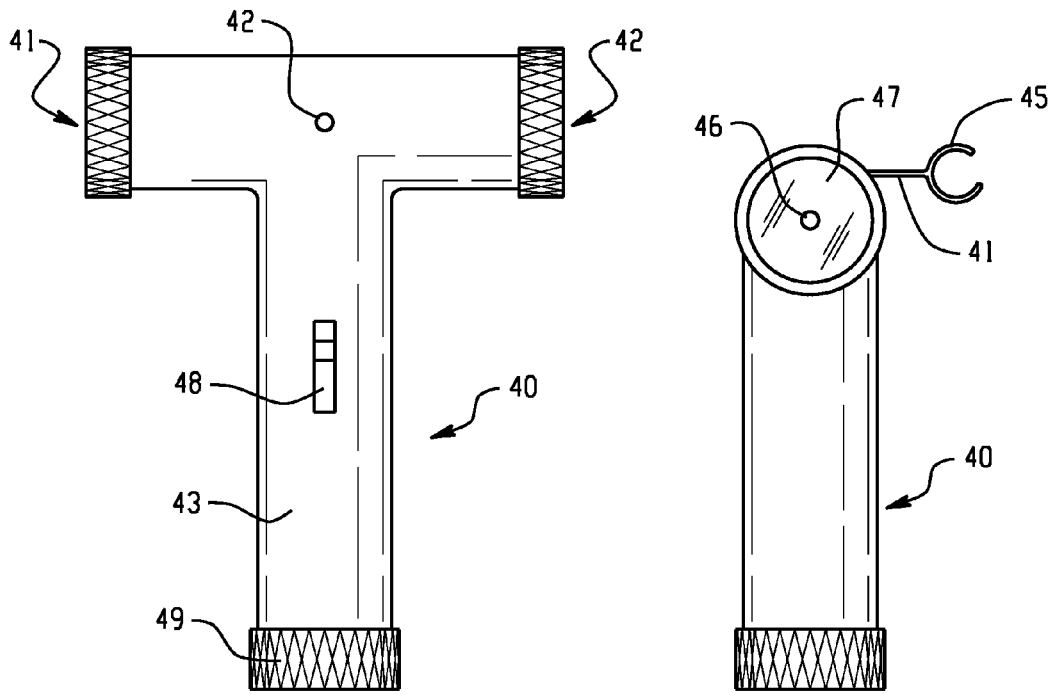
FIGS. 15A and 15B depict an embodiment of the lighting apparatus comprising two lights sources and a mechanical leveling mechanism.

Still further embodiments of the lighting apparatus comprising a mechanical leveling device are shown in FIGS. 15A, 15B, 16A and 16B. In the embodiment shown in FIGS. 15A and 15B, lighting apparatus 40 comprises a first light source 41 and a second light source 42. The battery housing 43 and enclosed battery act as the counter weight and allows the lighting apparatus to rotate about pivot 42 to maintain the light sources 41 and 42 at the desired orientation. The lighting apparatus may comprise an on/off switch 18 and battery access door 49. All the embodiments described herein may comprise any conventional on/off switch and battery access door such as, but not limited to a screw off cap. FIG. 15B provides a different view of the embodiment of the lighting apparatus of FIG. 15A. As shown in FIG. 15B, lighting apparatus 40 comprises a directional light comprising a light source 46, a parabolic reflector 47 and a lens 48. The lighting apparatus further comprises a connector comprising a pin or axle 41 and a connector 45 that allows the lighting apparatus to be either permanently or removably connected to an object. As used herein, "removably connected" means that the lighting apparatus is connected to the object that may be removed by a typical consumer such as a by a hook and loop connector, friction connection, a bolt, thumb screw or wing nut, or other connector that does not require special tools or skills to remove and in not a more permanent connectors such as rivets or permanent glue. The connector 45 may be useful for attaching the lighting apparatus to a tube or frame member of a bicycle, tricycle, wheel chair, wheel barrow, a crutch, trekking pole or ski pole, for example.

Figures 16A, 16B:
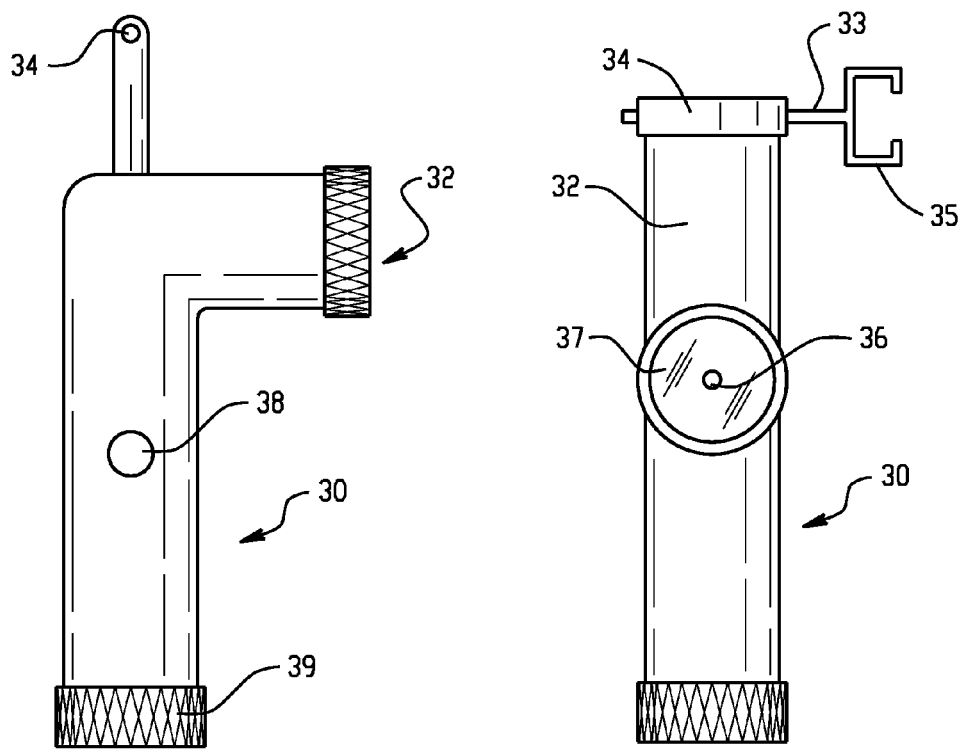
FIGS. 16A and 16B depict an embodiment of the lighting apparatus comprising one light source and a mechanical leveling mechanism attached to the top of the lighting device.

The embodiment shown in FIGS. 16A and 16B is similar to the embodiment shown in FIGS. 15A and 15B, however, for instance, the lighting apparatus 30 comprises only one light source 32. Again, the battery housing 33 and enclosed battery act as the counter weight and allows the lighting apparatus to rotate about pivot 34 to maintain the light source 32 at the desired orientation. The lighting apparatus may comprise an on/off switch 38 and battery access door 39. However, the lighting apparatus 30 comprises a connector comprising a pin or axle 33 that is attached to a connector member 32 and a connector 35 that allows the lighting apparatus to be either permanently or removably connected to an object. The connector member 32 allows the counter weight to be extended further below the pivot 34.

The embodiments of the lighting apparatus shown in FIGS. 15A and 16A may further be rotatably connected in a housing as described above.

In other embodiments, the lighting apparatus may comprise a plurality of light sources and an orientation or tilt sensor ("orientation sensor") instead of the liquid or mechanical leveling mechanisms. Whereas a mechanical leveling mechanism may rely on the force of gravity to maintain the light shining in the desired direction, an electronic mechanism comprising an orientation sensor may utilize a processor or microcontroller ("processor") in communication with a plurality of light sources to maintain a light source shining in the desired direction. Typical processors comprise several general purpose input/output pins (GPIO). GPIO pins may be software configurable to either an input or an output state. When GPIO pins are configured to an input state, they are often used to read sensors or external signals such as from the orientation sensor; configured to the output state, GPIO pins can drive or activate external devices such as the light sources, LEDs, for example.

The electronic mechanism may comprise a processor that activates at least a portion of the lights based upon an orientation parameter output from the gyro chip. The processor may be programmable or have a static memory comprising the desired lighting coordinates. If programmable, the processor may be programmed to activate at least a portion of the light sources based upon the orientation parameters output from the orientation sensor. The orientation parameters may include one or more of x, y, and z coordinates; tilt, yaw and roll; one or more of x, y, and z coordinates compared to a referenced direction; an angular velocity or degree of rotation; or the difference between current and previous x, y and z components. In a specific embodiment, the orientation parameters indicate the change in orientation of the lighting apparatus relative to a horizontal position.

The orientation sensor may be at least one gyroscope chip or at least one accelerometer including, but not limited to, a linear accelerometer, a combination of a gyroscope chip and an accelerometer or an inertial measurement unit, for example. Determining the tilt of an object by use of linear accelerometers is described in "*Tilt Sensing Using Linear Accelerometers*" available from Freescale Semiconductor, Document Number: AN3461 Rev. 4, 2/2012 (available at http://www.freescale.com/files/sensors/doc/app_note/AN3461.pdf), which is hereby incorporated by reference. A gyroscope chip may also be used to determine the orientation parameters. Determining the tilt or angular velocity of an object by use of gyroscope chip is described at http://www.starlino.com/imu_guide.html, which is hereby incorporated by reference. Accelerometers and gyroscope chips are readily commercially available with the appropriate wiring diagrams.

The processor may be programmable to simply rely on the programmed x and y or rotational coordinates in which a particular light source may be switched to the on position ("activated"). In this embodiment, any one light source or set of light sources mounted in an array around the circumference of a housing mechanism would be illuminated when the desired direction is obtained. In the embodiment of the lighting apparatus 60 in FIG. 17, the lighting apparatus 60 comprises a cylindrical housing 61 comprising a plurality of light sources or sets of light sources 62. The light sources 62 of lighting apparatus 60 are evenly distributed around the peripheral surface of the cylindrical housing 61. In this embodiment, the lighting apparatus 60 comprises 24 light sources or sets of light sources 62.

Figure 17:
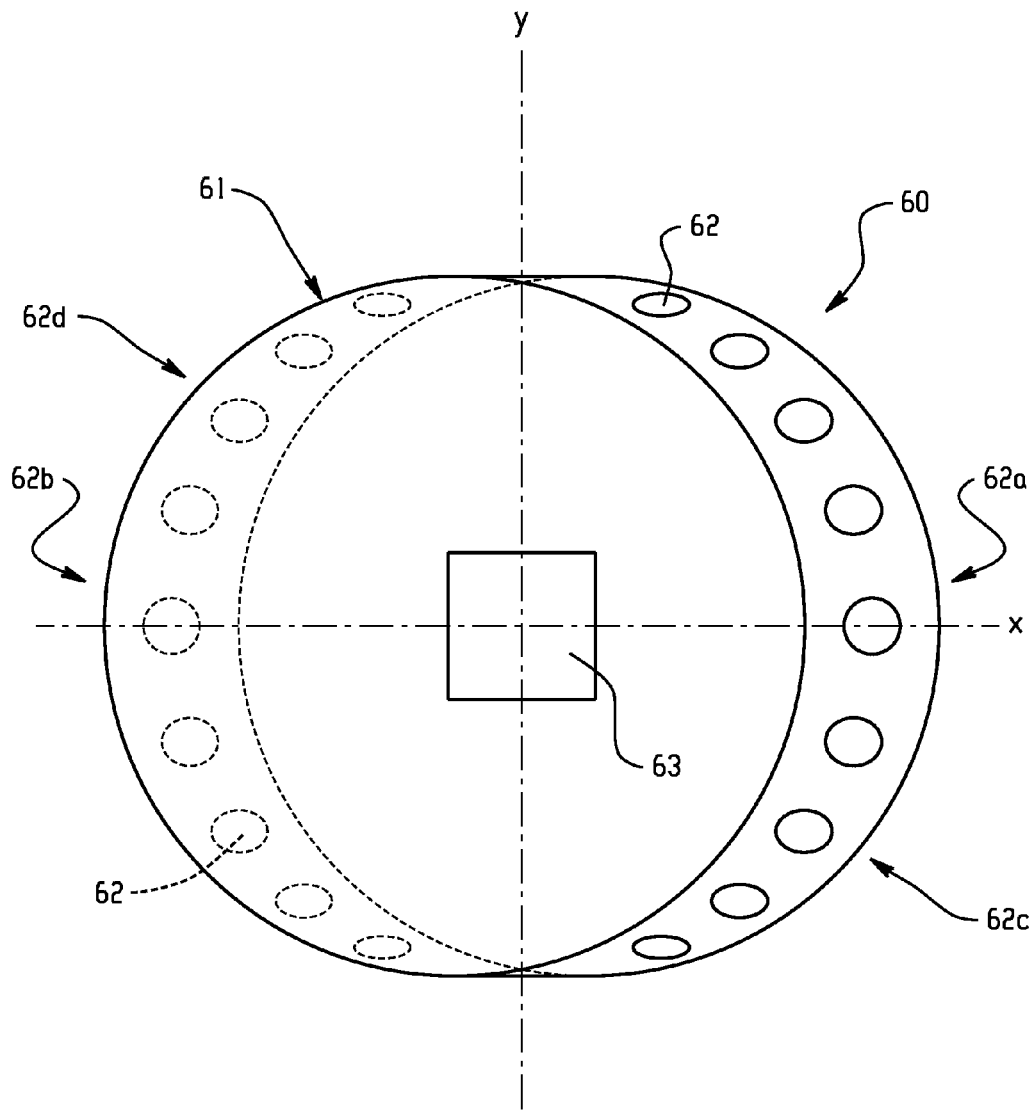
FIG. 17 depicts an embodiment of a lighting apparatus comprising an orientation sensor and a plurality of light sources.

The processor 63 of lighting apparatus 60 may be a programmable processing unit or a processing unit with a static memory. The lighting apparatus further comprises orientation sensor (not shown). The processor 63 activates at least a portion of the light sources 62 based upon orientation of the lighting apparatus 60 as determined from the orientation parameters received from the orientation sensor. As shown in FIG. 17, the processor 63 is programmed to activate the forward facing light sources 62a and rearward facing light sources 62b along the horizontal, as shown by axis x. If the lighting apparatus is rotated or tilted through the x,y plane, the orientation sensor of lighting apparatus 60 is capable of determining the new orientation of the lighting apparatus 60 compared to the horizontal (or other reference orientation) and determines the current orientation parameters. The orientation sensor then communicates the orientation parameters to the processor 63. The processor 63 interprets the orientation parameters and compares them to the desired light orientation information in the memory of the processor 63 and determines whether a different set of light sources should be activated.

For example, the lighting apparatus 60 of FIG. 17 is designed to maintain a forward shining white light and a rearward shining red light. The processor 63 correspondingly has activated forward light sources 62a and rearward light sources 62b. If the lighting apparatus 60 is rotated approximately thirty degrees in the counter clockwise direction through the plane x,y, the orientation sensor will sense the angular rotation and/or change in orientation of the lighting apparatus and send new orientation parameters to the processor 63. Processor 63 may then activate the currently forward facing light sources 62c and currently rearward facing light sources 62d after or during rotation or tilting. The process is automatically reversed after a subsequent clockwise rotation. Each of the individual light sources or sets of light sources 62 are individually in electrical communication with a power source and the processor is capable of individually activating the appropriate light sources or sets of light sources based upon the orientation parameters from the orientation sensor. As such, embodiments of the lighting apparatus may incorporate a design that comprises an array of LED lights mounted in a cylindrical housing that are switched on by a processor and an electronic gyro when the programmed direction of the gyro (in this example horizontal) is achieved.

The housing of the lighting apparatus may be any other desired shape such as, but not limited to, spherical, tubular with rounded ends, or egg shaped, for example.

The gyroscope on the gyroscope chip may be one of a piezoelectric gyroscope, a vibrating wheel gyroscope, a tuning fork gyroscope, a hemispherical resonator gyroscope, or a rotating wheel gyroscope, for example. Orientation sensors are available Any of the embodiments of the lighting apparatus may further comprise a locking mechanism that prevents the lighting device from rotating about the pivot. The locking mechanism may be any conventional locking mechanism such as, but not limited to, a pin and recess, a latch, a friction brake, or other mechanism that interferes or prevents rotation of the lighting device relative to the pivot.

There are many uses of the lighting apparatuses describe herein. Embodiments of the lighting apparatuses provide a forward shining horizontal light beam and a rearward shining amber glow of light that when attached to object that will change angles during use (a pulled wheel aboard piece of luggage, a carried tote, etc.) will maintain the light shining in a substantially stable position. For example, as the object changes angles, the invention maintains a horizontal beam of light in the front with a warning or indicator light shining from behind. Other uses of the invention are mounting the light to the sides of a stroller; while the stroller may not necessarily change angles by design, having light shining forward has the same effect as headlights and running lights on a car. Additionally, the lights could easily be mounted to head gear worn by children and adults in such activities as biking, skate boarding or anything requiring the use of a helmet. The lights can also be mounted (with a simple piece of Velcro) to the side of a runner or walker's clothes and thus giving the same results as an automobile with headlights. The lights can also be used in tents, camp sites, vehicles and boats.

The embodiments of the described methods and lighting apparatuses are not limited to the particular embodiments, components, method steps, and materials disclosed herein as such components, process steps, and materials may vary. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

The invention claimed is:

1. The lighting apparatus, comprising:
a first light source,
a pivot connected to the light source; and
a leveling mechanism capable of urging the light source to rotate about the pivot to maintain a desired orientation, wherein the leveling mechanism comprises a sealed cylindrical body and a liquid within the sealed cylindrical body.

2. The lighting apparatus of claim 1, wherein the first light source is within the sealed cylindrical body, is connected to the sealed cylindrical body by the pivot and is capable of rotating about the pivot within the sealed cylindrical body.

3. The lighting apparatus of claim 2, wherein the sealed cylindrical body is about half filled with the liquid or less.

4. The lighting apparatus of claim 3, wherein the pivot is connected substantially to the center of the sealed cylindrical body.

5. The lighting apparatus, comprising:
a first light source,
a pivot connected to the light source; and
a leveling mechanism capable of urging the light source to rotate about the pivot to maintain a desired orientation, wherein the leveling mechanism comprises a cylindrical body, wherein the first light source is within the cylindrical body, is connected to the cylindrical body by the pivot and comprises a counter weight connected to a bottom portion of the light source that is capable of rotating the first light source about the pivot when the cylindrical body is rotated about the pivot.

6. The lighting apparatus, comprising:
a first light source,
a pivot connected to the light source;
a leveling mechanism capable of urging the light source to rotate about the pivot to maintain a desired orientation; and
at least one counterweight connected to a bottom portion of the first light source, wherein the first light source comprises a power source, a light, and light source housing.

7. The lighting apparatus of claim 6, wherein the first light source comprises a power source, a light, and light source housing.

8. The lighting apparatus of claim 6, comprising a connector capable of attaching the lighting apparatus to an object.

9. The lighting apparatus of claim 8, wherein the connector comprises at least one of a hook and loop connector, adhesives, double sided tape, a bracket for a square tube, a bracket for a round tube, a U-type bracket, a lab frame type connector with a thumb screw, a screw, a bolt, a bracket, a magnet, and a suction cup.

10. The lighting apparatus of claim 6, wherein the counterweight is connected to the light source housing.

11. The lighting apparatus of claim 10, wherein the counterweight comprises the power source.

12. The lighting apparatus of claim 11, wherein the power source is a battery.

13. The lighting apparatus of claim 6, wherein the first light source is a directional light source.

14. The lighting apparatus of claim 6, the pivot comprises a horizontal axle.

15. The lighting apparatus of claim 6, wherein the pivot comprises a releasable connector.

16. The lighting apparatus, comprising:
a first light source,
a pivot connected to the light source; and
a leveling mechanism capable of urging the light source to rotate about the pivot to maintain a desired orientation, wherein the pivot is attached to a top portion of the light source and the leveling mechanism comprises a counterweight comprising at least one battery.

17. The lighting apparatus of claim 16, comprising a second light source.

18. The lighting apparatus, comprising:
a first light source and a second light source,
a pivot connected to the light source; and
a leveling mechanism capable of urging the light source to rotate about the pivot to maintain a desired orientation, wherein the second light source is a directional light source and is directed in a different direction than the first light source.

19. The lighting apparatus of claim 18, a connector for removably attaching the lighting apparatus to a tubular frame for hands free use.

20. A lighting apparatus, comprising:
a plurality of light sources directed in different directions and mounted in an array around the peripheral surface of a housing, a power source, and an integrated circuit, wherein the integrated circuit comprises:

a gyroscope circuit that generates a orientation parameter based on orientation of the lighting apparatus compared to a horizontal position; and a processing module in electrical communication with the gyroscope circuit to receive the orientation parameter and to activate a light source or set of light sources of the plurality of light sources to direct light in the desired direction and to deactivate the light sources not directed in the desired direction based upon the orientation parameter.

21. The lighting apparatus of claim 20, wherein the plurality of light sources are arranged around the peripheral surface of a cylindrical housing and project radially.

22. The lighting apparatus of claim 20, wherein the plurality of light sources are arranged around the circumference of a spherical housing.

23. The lighting apparatus of claim 20, wherein the gyroscope circuit comprises at least one of a piezoelectric gyroscope, a vibrating wheel gyroscope, a tuning fork gyroscope, a hemispherical resonator gyroscope, or a rotating wheel gyroscope.

24. The lighting apparatus of claim 20, wherein the desired direction is a horizontal direction.

25. A lighting apparatus, comprising:

a plurality of light sources, a power source, and an integrated circuit, wherein the integrated circuit comprises:

a gyroscope circuit that generates a orientation parameter based on orientation of the lighting apparatus compared to a horizontal position; and a processing module in electrical communication with the gyroscope circuit to receive the orientation parameter and to activate the plurality of light sources, wherein the processing unit activates at least a portion of the light sources based upon the orientation parameter, wherein the processing unit activates a portion of the light sources based upon difference between a previous value of the orientation parameter and a current value of the orientation parameter.

* * * * *